UNITED STATES PATENT OFFICE.

SAMUEL S. NELLIGAR, OF WASHINGTON, DISTRICT OF COLUMBIA.

PAINT AND METHOD OF MAKING SAME.

1,200,968.  Specification of Letters Patent.  Patented Oct. 10, 1916.

No Drawing.  Application filed August 5, 1914.  Serial No. 855,303.

*To all whom it may concern:*

Be it known that I, SAMUEL S. NELLIGAR, a citizen of the United States, residing at Washington, District of Columbia, have invented certain new and useful Improvements in Paint and Methods of Making Same, of which the following is a specification.

My present invention relates to paints, and especially to paints having lithopone as a pigment, and which shall be free from certain of the objectionable features present in those lithopone paints, previously on the market.

It has been generally recognized, by workers in this art that lithopone is a very good pigment, and especially for flat paint, but this is open to certain objectionable features, especially when used in locations where the direct sunshine is allowed to act on the painted surface. Under these conditions, the pigment will, in many instances, turn dark, rather rapidly, and if the paint is white, it will soon turn to a grayish color, giving a dirty appearance to the painted surface. This is highly disadvantageous, as it has prevented the extended use of paints containing lithopone, in all places where the direct sunlight will strike the work, and consequently this has limited the use of lithopone to inside work, and to places free from direct sun.

A serious objection, to the use of the paints heretofore employed, containing a considerable amount of turpentine, has been the penetrating and persistent odor of this material, which is objectionable to most people. It has heretofore been proposed to substitute gasolene and other similar liquids, in place of all, or a portion of the turpentine employed in paints, primarily on account of the cheapness of gasolene as compared with turpentine, but this substitution has not given entire satisfaction, for the reason that the paints thereby produced are of inferior quality, particularly as regards the elasticity and durability. The paint vehicle, which I preferably employ includes turpentine, but includes materials which greatly modify the odor thereof. I have found after careful experiments, that I can overcome these objections by the use of the following formula: I grind together, lithopone, 124 parts, sublimed lead, or zinc lead, 60 parts, to which I may add zinc oxid, 2 parts, asbestine, 2 parts, starch, 4 parts, silica, (silex) 2 parts. These materials are ground in a varnish free from ordinary rosin, such as a varnish composed of turpentine-linseed oil-copal, to which may be added a solution of 4 parts of paraffin wax dissolved in 12 parts of turpentine. This mixture is then thinned with a thinning agent, which may be composed of a mixture of 32 parts of gum olibanum, 170 parts of turpentine, 430 parts of linseed oil, which will require about 6 gallons (more or less) of this thinner to 230 pounds of the paste paint, containing about 200 pounds of mixed pigment. These proportions are sufficient to make a thin, ready flowing paint. If more thinner is needed a small amount of a mixture of linseed oil and turpentine may be added, or if too thin a little more of the ground pigment (or paste) may be added. The proportions above stated will generally be right for a mixed paint. The linseed oil, when making white paint should be what is generally termed "bleached" oil, although for colored paints this is not always necessary. Any desired amount of color may be added to produce paints having the desired tint. Certain of the ingredients are optional, the paraffin being added as a color-preservative, and to prevent sagging, and the starch to kill the gloss. A small part of the gum olibanum may be replaced by gum mastic, say about 10%. Such a paint will be entirely free from the objectionable feature of darkening in the sunlight, and will have an excellent brightness, and will be flat. I call attention to the fact that the lead is preferably sublimed lead, (basic lead sulfate) and not white lead (basic lead carbonate) as the latter will not overcome the feature of darkening in sunlight. The grinding of the pigments in the varnish will make the step of thinning much easier than would be the case, were oil used, to grind in, and the amount of varnish will not disturb the flatness, as the gloss of the varnish will be killed by the thinner.

As above stated, I may use "zinc-lead" instead of the sublimed lead, and it will be noted that the lead of this is mostly in the form of sulfate, and not basic carbonate. White lead must be avoided, as it will not give with lithopone, a paint which will be fast to direct sunlight. Any lead pigment, in which the lead is present principally in the form of sulfate, appears to be suitable.

What I claim is:

1. A composition of matter comprising lithopone, a sulfatized lead pigment, varnish, linseed oil, turpentine, and gum olibanum in such proportions as to produce a paint.

2. A composition of matter comprising lithopone, sublimed lead, a varnish, starch, paraffin, linseed oil, turpentine, gum olibanum, asbestine and silica, in such proportions as to produce a paint.

3. A paint including lithopone, a sulfatized lead pigment, a varnish, starch, paraffin, linseed oil, turpentine, and gum olibanum, in substantially the proportions specified.

4. A process of making a paint which comprises grinding lithopone and a sulfatized lead pigment, in a varnish, adding a vehicle including gum olibanum dissolved in a solvent, said materials being so proportioned as to produce a paint.

In testimony whereof I affix my signature in presence of two witnesses.

SAMUEL S. NELLIGAR.

Witnesses:
A. B. FOSTER,
BENNETT S. JONES.

Copies of this patent may be obtained for five cents each, by addressing the "Commissioner of Patents, Washington, D. C."